UNITED STATES PATENT OFFICE.

ALFRED A. WELLS, OF CALDWELL, NEW JERSEY, ASSIGNOR TO ELLIS-FOSTER COMPANY, A CORPORATION OF NEW JERSEY.

VULCANIZED CUMARON-RUBBER PRODUCT AND PROCESS OF MAKING SAME.

1,248,226.  Specification of Letters Patent.  Patented Nov. 27, 1917.

No Drawing.  Application filed April 25, 1917. Serial No. 164,575.

*To all whom it may concern:*

Be it known that I, ALFRED A. WELLS, a citizen of the United States, residing at Caldwell, in the county of Essex and State of New Jersey, have invented certain new and useful Improvements in Vulcanized Cumaron-Rubber Products and Processes of Making Same, of which the following is a specification.

This invention relates to preparation of mixtures of rubber or rubber compositions such as those generally known as compounded rubber and relates particularly to compositions containing cumaron resin which is a product derived by the polymerization of cumaron, indene, and the like, contained in solvent naphtha or similar raw material.

Cumaron resin may be obtained in different grades of hardness, ranging from liquid substances and plastic bodies to hard, brittle material of high melting point and these various grades of resinous material adapt themselves well in the manufacture of soft and hard rubber as the resin is comparatively inert in its action on rubber, thereby differing from ordinary rosin, which as is well known, is quite a strong oxidizing agent.

In the manufacture of different compositions, various kinds of rubber may be employed, such as Pará, Kongo, Pontianak, guayule, plantation rubber, and various natural and reclaimed rubbers, as also various rubber substitutes, including white and brown substitutes, polymerized oils and the like. In some of the cheaper mixtures, asphalt, pitch, candle tar, various oils, waxes and stearic acid may be employed, while in hard rubbers and also certain other grades of rubber, carnauba wax, Chinese wax, Japanese wax, candelilla wax, etc., may be employed. In other preparations or compounds, vaseline and mineral oils may be incorporated.

Various mineral matters and filling agents such as iron oxid, silica, graphite, asbestos, barytes, magnesium oxid and magnesium carbonate, calcium carbonate, lithopone, zinc oxid, white lead, zinc sulfid, litharge, antimony sulfid, both red and golden, and other agents of a pigmentary character, such as cadmium sulfid, chromium oxid, indigo, ultra marine, sulfid of arsenic, and various lakes which are not materially affected by sulfur, may be employed.

The proportion of cumaron resin may vary from a few per cent. up to a large proportion of the material depending on the particular use to which the rubber composition is to be put.

Examples of compositions of this character are the following:

A cheap mixture suitable for packing rings and the like is the following:

| | |
|---|---|
| Kongo rubber | 50 parts. |
| Reclaimed rubber | 40 " |
| Barytes | 110 " |
| Lithopone | 85 " |
| Sulfur | 3 " |
| Cumaron resin | 20 " |
| Magnesium oxid | 1 part. |
| Fiber | 12 parts. |

The proportions stated above are by weight. The ingredients are incorporated in the usual manner and worked into the proper intimate admixture and suitably vulcanized.

Another composition of a higher grade is the following:

| | |
|---|---|
| Para rubber | 35 parts. |
| Kongo rubber | 60 " |
| Cumaron resin | 10-20 " |
| Brown substitute | 25 " |
| China clay | 15 " |
| Vermilion | 1 part. |
| Golden sulfid of antimony | 20 parts. |
| Magnesium oxid | 1 part. |

In another case 5 parts of rubber composition were incorporated with 1 part of powdered cumaron resin by passing repeatedly through calender rolls. Approximately ½ part of talc was used to keep the composition from adhering to the roll. When the mass was uniform in mixture it was vulcanized at 155° C.

In still another case 10 parts of rubber substitute, 5 parts of cumaron resin and 5 parts of rubber flux were warmed and thoroughly mixed. Litharge, magnesium carbonate, barytes and talc were incorporated to bring the mass up to the proper consistency and then vulcanized. A product was obtained which was suitable as a cheap gasket compound.

While no prohibition is made against the use of resinous bodies other than cumaron resin it may be stated that many of these resinous products are injurious to rubber on account of their oxidizing effect, while cumaron resin does not have the properties of resinous bodies containing terpenes, turpentine, etc., as regards oxidizing action but blends well with rubber materials, etc., not having any such injurious effect from an oxidizing standpoint and in fact tending to protect the rubber against oxidation so that it may be looked upon rather as a preservative than as a destructive agent, and the invention embraces the application of coumarone resin as a protective or stabilizing agent for rubber to render it less prone to oxidizing action, especially in the case of reclaimed rubber which easily deteriorated.

The term extending materials or agents as used herein refers to the various filling substances employed in rubber compounds or compositions such as mineral powders or organic substances. For example, rubber substitute made by treating vegetable oils with sulfur or sulfur chlorid may be employed as a filling agent. The brown substitute referred to above is of this character.

What I claim is:—

1. A vulcanized composition rubber product comprising natural and reclaimed rubber, cumaron resin and extending materials.

2. As a new article of manufacture a non-plastic rubber composition containing cumaron resin as a protective agent against oxidation.

3. A vulcanizable composition comprising rubber, cumaron resin, sulfur and extending agents.

4. A rubber composition comprising natural and reclaimed rubber, cumaron resin and a vulcanizing agent.

5. As a new article of manufacture a vulcanized composition containing reclaimed rubber and cumaron resin as a protective agent against oxidation.

6. As a new article of manufacture, a vulcanized product comprising rubber and cumaron resin.

7. As a non-plastic composition a vulcanized mixture comprising rubber, a Pará resin and a filler.

8. The herein described process which comprises vulcanizing a mixture containing a rubber material and cumaron resin.

ALFRED A. WELLS.